US006331858B2

(12) United States Patent
Fisher

(10) Patent No.: US 6,331,858 B2
(45) Date of Patent: Dec. 18, 2001

(54) DISPLAY TERMINAL USER INTERFACE WITH ABILITY TO SELECT REMOTELY STORED SURFACE FINISH FOR MAPPING ONTO DISPLAYED 3-D SURFACE

(75) Inventor: Kim J. Fisher, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/077,604
(22) PCT Filed: Apr. 7, 1998
(86) PCT No.: PCT/GB98/01022
    § 371 Date: Jun. 2, 1998
    § 102(e) Date: Jun. 2, 1998
(87) PCT Pub. No.: WO98/47106
    PCT Pub. Date: Oct. 22, 1998

(30) Foreign Application Priority Data

Apr. 16, 1997 (GB) .................................................. 9707704

(51) Int. Cl.[7] ...................................................... G09G 5/00
(52) U.S. Cl. ................................ 345/582; 705/26; 705/27
(58) Field of Search ..................................... 345/418, 419, 345/429, 430, 431, 432, 425, 473, 474, 339, 335, 572, 582, 587, 619, 620, 719, 738; 705/26, 27; 707/530, 540, 3, 4, 102, 104, 5, 6, 10, 513, 501; 709/217–219

(56) References Cited

U.S. PATENT DOCUMENTS

| | | | | |
|---|---|---|---|---|
| 5,495,576 | * | 2/1996 | Ritchey | 395/125 |
| 5,729,471 | * | 3/1998 | Jain | 345/419 |
| 5,764,241 | * | 6/1998 | Elliott | 345/433 |
| 5,880,733 | * | 3/1999 | Horvitz | 345/343 |
| 5,920,261 | * | 7/1999 | Hughes | 340/572 |
| 5,977,978 | * | 11/1999 | Carey | 345/419 |
| 5,986,675 | * | 11/1999 | Anderson | 345/473 |
| 6,018,748 | * | 1/2000 | Smith | 707/501 |
| 6,167,378 | * | 12/2000 | Webber | 705/8 |
| 6,189,019 | * | 12/2000 | Blumer | 345/357 |

FOREIGN PATENT DOCUMENTS

| | | |
|---|---|---|
| 0468126 A | 1/1992 | (EP) . |
| 0794517 A | 9/1997 | (EP) . |
| 2702291 A | 9/1994 | (FR) . |
| 96 03717 A | 2/1996 | (WO) . |
| 97 15889 A | 5/1997 | (WO) . |

OTHER PUBLICATIONS

Certain et al, "Interactive Multiresolution Surface Viewing", Computer Graphics Proceedings 1996 (Siggraph), New Orleans, Aug. 4–9, 1996, Aug. 4, 1996, Association for Computing Machinery, pp. 91–98, XP000682725.

* cited by examiner

Primary Examiner—Matthew Luu
Assistant Examiner—Wesner Sajous
(74) Attorney, Agent, or Firm—Nixon & Vanderhye P.C.

(57) ABSTRACT

A user interface on a display terminal, such as a personal computer, includes a 3D display region which shows a scene incorporating a number of objects, such as items of furniture. A surface finish selector is also displayed and is used to select a surface finish from a number of alternatives. In the case of items of furniture, these finishes may correspond to different fabrics for upholstery. A surface texture data for a selected finish is automatically downloaded from a remote source and mapped onto the object in the 3D scene. In a preferred implementation, the surface finish selector is a frame of a web page and generates control data which is passed to another frame containing the 3D scene together with movement controls for changing the viewpoint in the scene.

33 Claims, 4 Drawing Sheets

Fig.2.
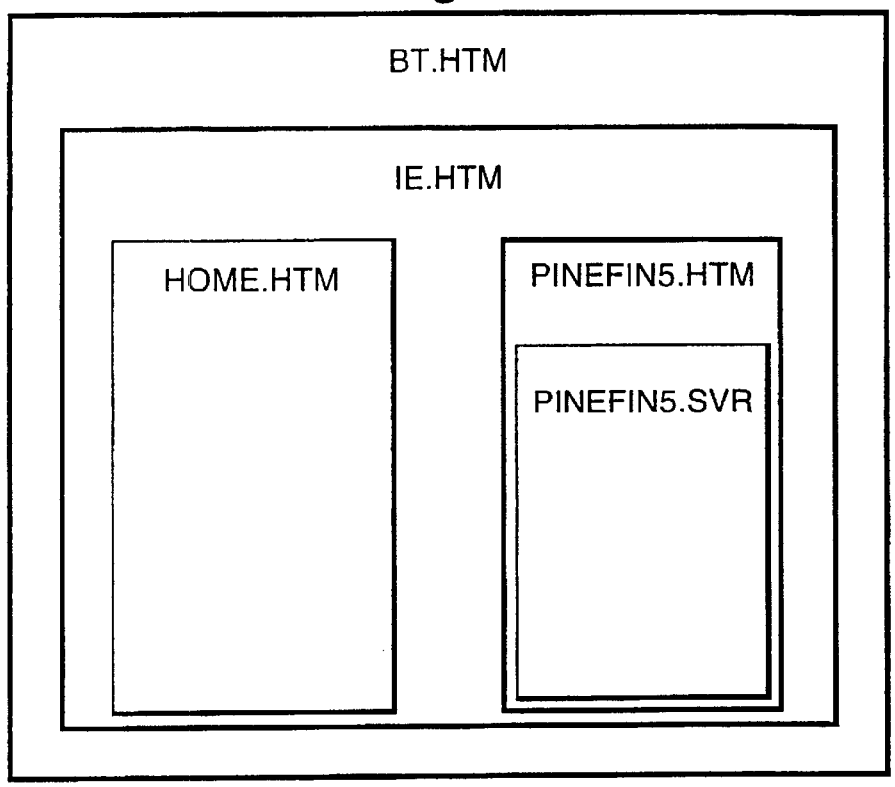
Fig.4.
—— FABRICS ——
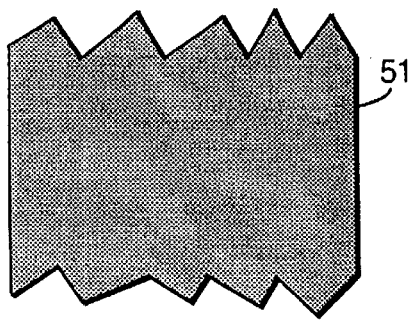
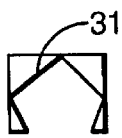 £12.95
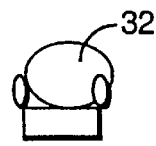 £19.95
£260

DISPLAY TERMINAL USER INTERFACE WITH ABILITY TO SELECT REMOTELY STORED SURFACE FINISH FOR MAPPING ONTO DISPLAYED 3-D SURFACE

BACKGROUND OF THE INVENTION

1. Field of the invention

The present invention relates to a display terminal, and in particular to a user interface for such a terminal.

2. Related Art

Computer art systems have the capability to "flood" a color or pattern within the boundary of a closed area displayed on a computer screen. Hitherto, conventional on-line catalogs have typically relied upon an arrangement analogous to that in a traditional showroom including, for example, photographs of a product in one selected finish together with details of alternative finishes.

According to a first aspect of the present invention, there is provided a user interface for a display terminal, the user interface comprising:

a 3-dimensional display region including one or more displayed objects;

a surface finish selector arranged to display to the user a plurality of alternative surface finishes for the said one or more displayed objects;

a user input device for selecting one of the plurality of alternative surface finishes;

means responsive to the user input device for reading, from a source which is remote from the terminal, data for a surface finish selected by the user, and a display generator for mapping the selected surface finish onto the displayed object using the said data.

Preferably the surface finish selector includes a 2-dimensional display of samples of the said surface finishes. Preferably the surface finish selector further comprises icons representing displayed objects to which the finishes shown in the samples may be applied.

The term "3-dimensional (3D) display" as used herein denotes a display with properties of perspective and/or parallax. It is not limited in scope to stereoscopic displays, such as those generated by a virtual reality headset, but includes also displays generated on a conventional 2-dimensional (2D) monitor.

The present invention provides a display terminal designed to facilitate on-line access, for example, to the catalogue of a furniture retailer. In real life, a furniture retailer may offer, for example, a dozen different sofas, each available in a number of different fabrics. Typically, the retailer will have on display in a showroom one example of each sofa in one fabric. The display sofa may be located in a set intended to represent a domestic interior. The customer is then shown fabric swatches and has to imagine what the sofa would look like in different materials in its intended setting. Just as in real life limitations of space prevent a retailer including in a showroom all the different possible permutations of shape and fabric, so also in conventional on-line catalogues, limitations of storage space and connection bandwidth have made it impractical to display directly the entire range. Hitherto, such on-line catalogues have typically relied upon an arrangement analogous to that in the showroom, including, for examples, photographs of a product in one selected finish, together with details of alternative finishes.

The present invention overcomes these limitations by providing a 3-dimensional display of the relevant product, together with a display of sample finishes, and then downloading from a remote source the data which is needed in order to map the selected finish onto the product in the 3-dimensional display. This allows the user to see directly and realistically any or all of the different combinations of product and fabric. This is made possible without unduly heavy demands on the storage capacity or bandwidth of the terminal, since typically only one selected finish need be downloaded at a time and the amount of data required to display a 2D sample of a finish is very much less than that required for a complete 3D texture map.

Preferably the user interface further comprises a movement controller for moving a viewpoint in the 3D display in response to a user input.

This preferred feature enables the user to make a more realistic assessment of a product including the selected finish by viewing it from different angles and at different distances. The movement controller may include control buttons displayed adjacent the 3D region, or may include a user input device with multiple degrees of freedom such as the 3D mouse available commercially as "Spacemouse".

Preferably both the surface finish selector and the 3-dimensional display region form part of a Web page displayed by a web client running on the said display terminal. Preferably in this case each of the surface finish samples includes a link to an internet address, or other network address, of the corresponding texture file. This preferred approach imports textures into a live web page over the internet.

According to a second aspect of the present invention, there is provided a display terminal including a user interface in accordance with the first aspect. The terminal may be, for example, a personal computer with an internet connection, or may be a dedicated multimedia terminal such as BT's Touchpoint (Trademark) kiosk.

According to a third aspect of the present invention, there is provided a method of operating a display terminal comprising:

a) displaying a 3-dimensional environment including one or more objects, b) displaying to a user samples of surface finishes which may be applied to the one or more objects, c) selecting by a user input one of the surface finishes;

d) retrieving from a source which is remote from the terminal, surface data corresponding to the selected finish;

e) mapping the said surface data onto the one or more objects in the 3-dimensional environment.

The 3-D environment may have been previously downloaded from a remote source, or may have been constructed or modified locally, for example using data for the home environment of the user.

According to a fourth aspect of the present invention, there is provided a method of operating a display terminal comprising:

a) loading and displaying on the terminal a web page including a plurality of surface finishes;

b) loading and displaying on the terminal a web page including a 3-dimensional environment, which 3-dimensional environment includes one or more objects;

c) in response to selection by the user of one of the plurality of surface finishes displayed in step (a), importing surface finish data and mapping the said data onto one of the said objects displayed in step (b).

BRIEF DESCRIPTION OF THE DRAWINGS

The present invention will now be described in further detail, by way of example only, with reference to the accompanying drawings, in which:

FIG. 2 is a diagram showing schematically the display on the terminal of FIG. 1;

FIG. 4 is a diagram showing a detail of the display on a terminal embodying the present invention;

DETAILED DESCRIPTION OF EXEMPLARY EMBODIMENTS

Figure 1:
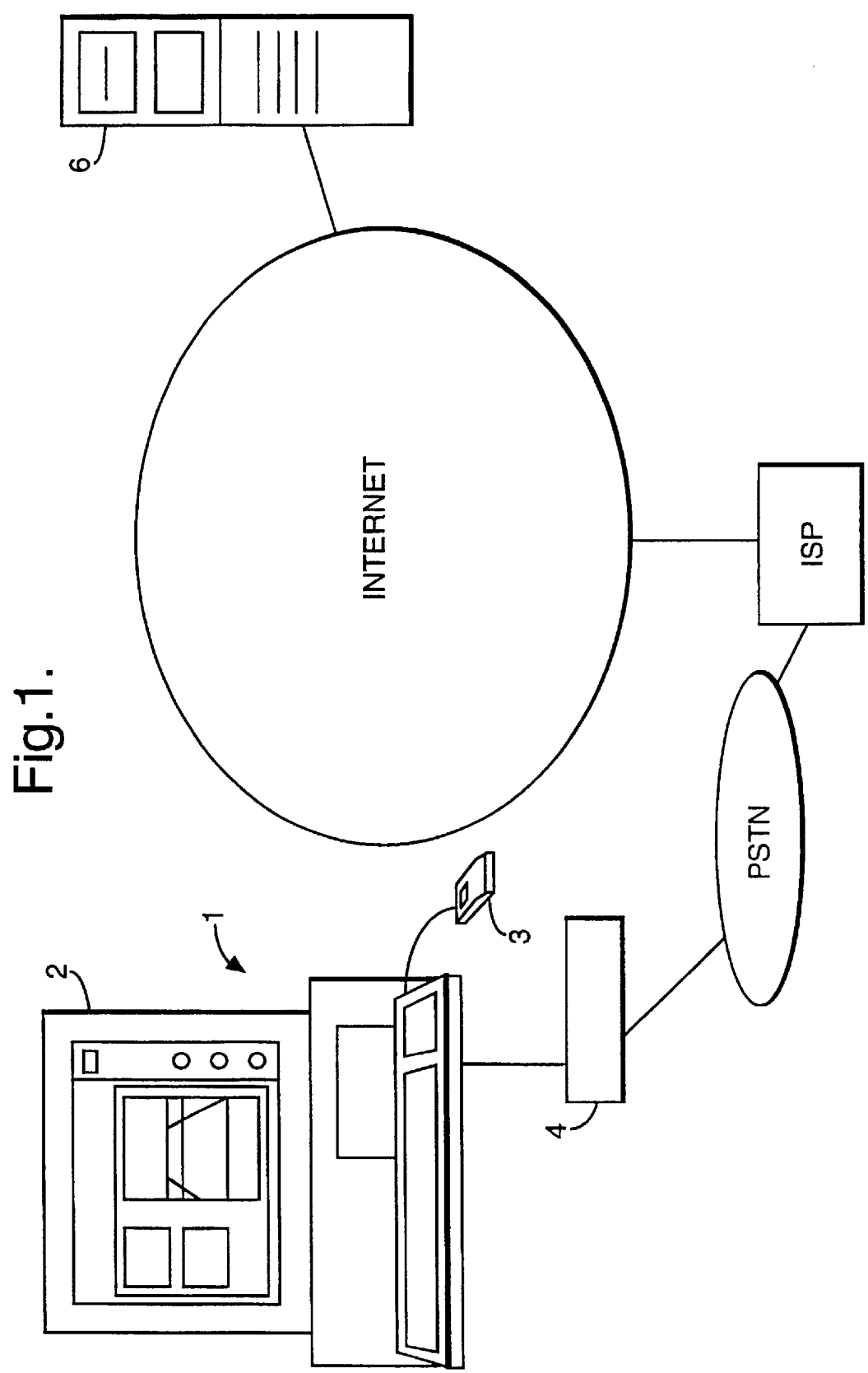
FIG. 1 is a diagram showing a network including a display terminal.

A display terminal comprises a personal computer 1. The personal computer includes a cathode ray tube (CRT) monitor 2 and a mouse 3. In this example, the personal computer includes an Intel 166 MHz Pentium MMX (Trademark) processor, together with regions of RAM and a hard disk mass storage device. The personal computer is connected via modem 4 and the PSTN (public switched telephone network) to an Internet Service Provider (ISP). A web browser, such as Microsoft Corporation's Internet Explorer (Trademark) runs on the processor of the personal computer 1, and in combination with the plug-in application described below, is responsible for generating a display on the monitor, and for interpreting input from the user. Using the web browser, the user accesses a web server 6 which, in this example, is maintained by a furniture retailer, and includes a product catalogue. The web server 6 then returns to the web client on the personal computer 1 a web page which has the format illustrated in FIG. 2. In this Figure, the different file names are included for ease of understanding, although normally such file names would not appear explicitly in the display. The top level document returned by the server 6 is, in this example, a file named BT.htm. This HTML file includes in turn two other web pages. A first web page, pinefin5.htm is displayed in a frame on the right hand side of the screen. This page includes a 3-dimensional virtual reality display of a domestic interior.

In the present example, the 3D interior is generated using a virtual world authoring system known as VRT which is available commercially from Superscape Ltd. The data generated by VRT is then viewed by the web browser using a plug-in application. The plug-in application makes use of a VRML (virtual reality markup language) viewer known as Viscape (Trademark), also commercially available from Superscape Ltd. The plug-in application also establishes a socket connection with the web port of the web server. It will be understood however that these particular generation and viewing tools are described by way of example only, and that other generators/viewers may be used without departing from the scope of the present invention. For example, there are widely available 3D world generation tools for the C programming language known as AVRIL, and resulting worlds may be viewed with any VRML-1 compliant viewer. As a further alternative, the JavaScript language supports 3D modelling.

The data for the 3D world contained in the pinefin5.htm web page is returned by the server as an SVR (Superscape Virtual Reality) file, pinefin5.svr.

The data is stored locally at the terminal The file type is identified by an appropriate MIME tag. The web page recognises the file type from the MIME tag and passes the data to the Viscape plug-in application. The application generates and displays, in this example, a 3D view of a domestic interior within a window in the frame on the right hand side. Movement control buttons are displayed at the bottom of the window. When selected with the mouse, these control buttons move the viewpoint for the 3D scene.

The 3D scene displayed in the right hand side frame includes a number of products from the catalogue of the retailer. In the present example, these objects include an upholstered chair, a carpet and curtains. Each of these objects is available in different fabrics. Initially these objects are displayed using a default fabric selection for each product. The SVR file includes an object for reading and displaying texture information. This object opens a file containing texture data, saves the data temporarily as a GIF file on the hard disk of the personal computer 1, and then maps the texture onto a selected object displayed in the 3D scene, using the "Texture" argument of the "LSprite" function defined in the SCL language.

A second web page, Home.htm is displayed in a frame on the left hand side of the screen. This contains a display of 2D samples or swatches of fabrics or materials which are available for the products displayed in the right hand frame. A form linked to a search engine may be included, to allow the customer to select a fabric sample by name. Alternatively, the user can scroll through all the available samples. Marker icons are displayed beside each sample. The marker icons identify objects in the 3D scene. The top left hand sample in this frame is shown as an enlarged detail in FIG. 3B. The relevant material is suitable for both curtains and for covering the upholstered chair. Accordingly, both a curtain marker 31 and a chair marker 32 are displayed with the sample. The user can select the fabric to be applied, for example to the chair, by clicking on the chair marker beside the fabric sample. The HTML document includes Javascript which detects the selection made by the user and sets the relevant marker parameter to a value which depends on which fabric was selected. This marker value is returned to the Viscape application where it is used to address an index of URL's (uniform resource locators) corresponding to texture data for different fabrics. A connection to the selected URL is then opened and the relevant texture file is downloaded and mapped onto the relevant object using the LSprite function, as described previously. The display of the 3D scene is immediately updated, so that the chair is shown finished in the newly selected fabric. This updating occurs automatically, without it being necessary to refresh the entire 3D frame.

It will be understood from the above description, that the HTML page in the left hand frame does not merely display fabric samples, but also functions actively to control the scene in the right hand frame, depending on input from the user.

An additional function performed by the left hand frame is the calculation of a total price for a product when covered in a selected fabric. A pricing data file includes values for the fabric lengths required for each object in the 3D scene, and a price per unit length for each fabric, and a base price for each object. A pricing function implemented in JavaScript then calculates the total price and displays this under the relevant sample, in response to the selection by the user of a relevant product cost icon 33, 34 shown underneath the sample.

After a final selection of finishes for all the objects in the 3D scene, the user may store the scene, including the selected surface finish data locally on the hard disk. The web browser may subsequently be pointed to the URL of another retailer or manufacturer. For example the web site of a paint manufacturer might be accessed. A new web page is then loaded into the left hand frame, to show a selection of different colour samples in different finishes (matt, gloss, silk etc.). These may then be selected by the user for walls or other features of the interior scene shown in the right hand frame. As described previously, the corresponding surface finish data is the imported into the 3D scene, which is modified accordingly, so that, for example, the walls are shown covered in the selected paint, together with the furniture shown in the fabrics selected at the first web site. Again, the left hand frame may include a pricing function to calculate the cost of a particular selection by the user, based, in this example, on the cost per unit volume of a selected paint, on the coverage required for the selected paint, and on the areas to which the paint is applied in the 3D scene.

Figure 3:
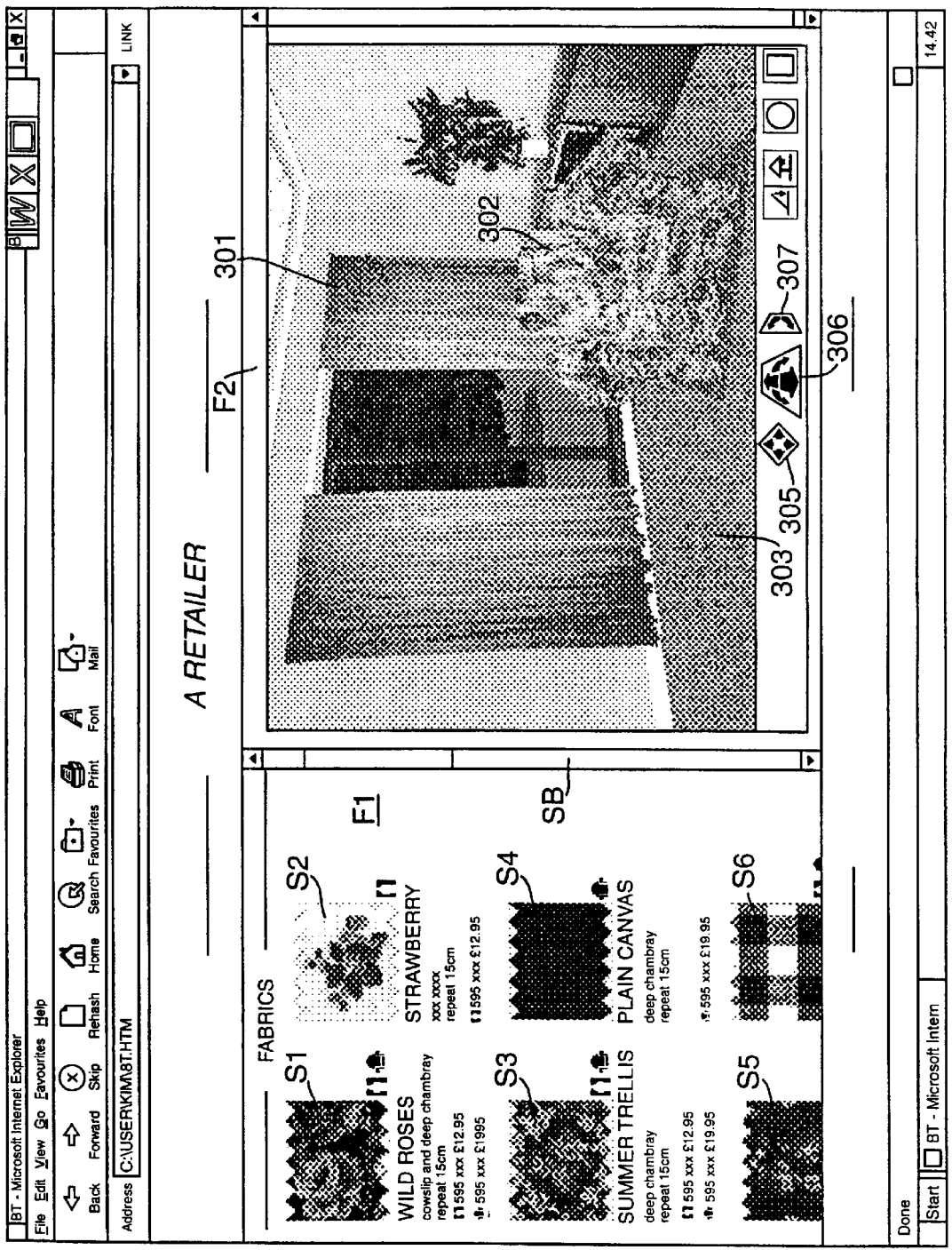
FIG. 3 is a first example of screen display from a terminal embodying the present invention.

FIG. 3 shows the screen display in the first example described above. A frame F1 on the left hand side displays a number of 2D fabric samples s1–s6. The frame is bounded by a scroll bar SB. On the right hand side of the screen, a frame F2 includes the 3D scene generated by the Viscape plug-in. The displayed objects include a curtains 301, chair 302 and carpet 303. Control buttons 305, 306, 307 move the viewpoint in 3 dimensions with respect to the scene, which changes correspondingly as the viewpoint moves.

FIG. 4 is a diagram showing an enlarged detail of the left hand frame.

Figure 5:
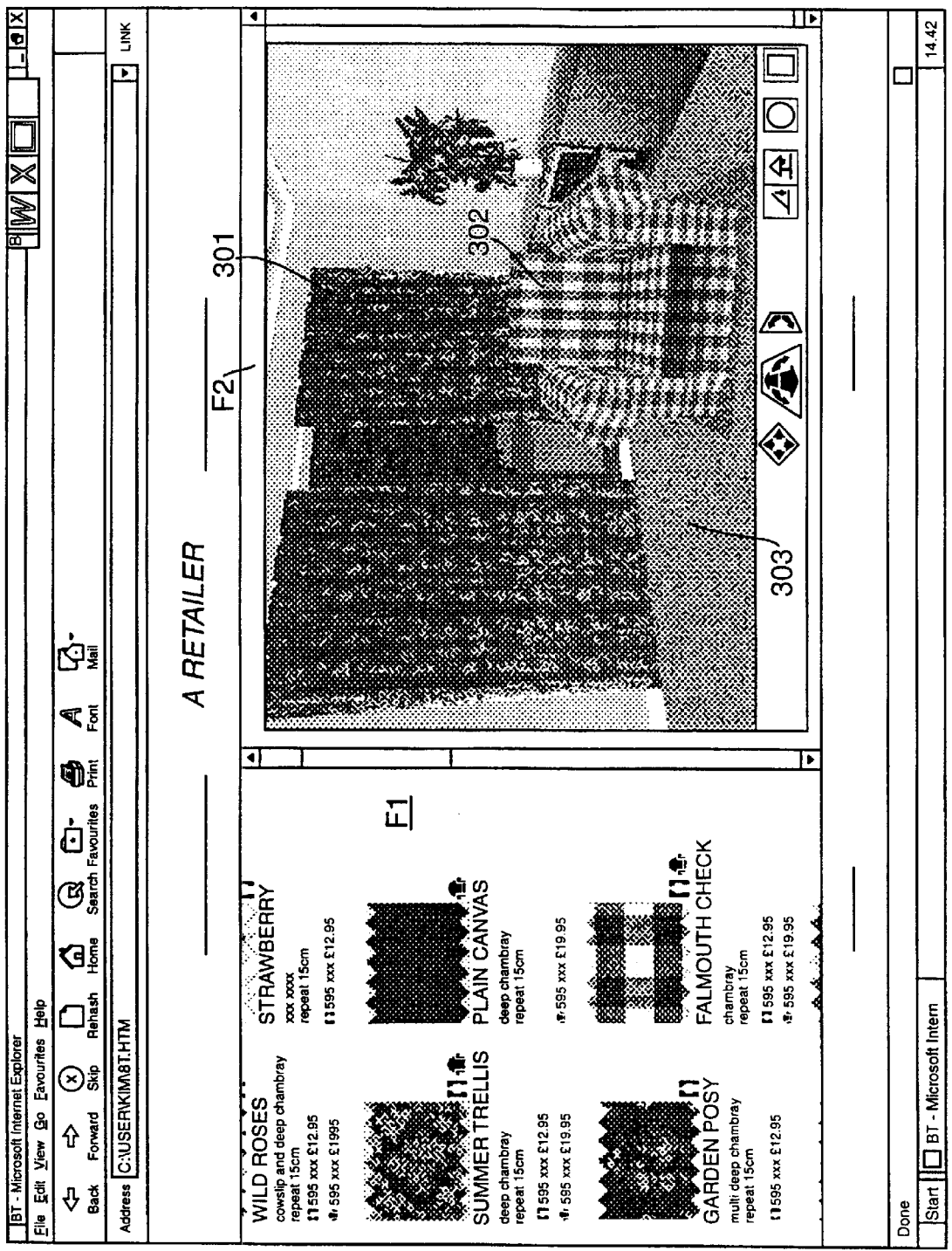
FIG. 5 is a second example of a screen display, showing modifications to the display of FIG. 3.

FIG. 5 shows how the screen display is changed after the user has clicked on the curtain marker icon beside the sample s3, and has clicked on the chair marker icon beside sample s6, and the corresponding different surface finishes have been mapped onto the curtains and chair in frame F2.

Although described above in relation to an on-line furniture catalogue, it will be understood that the invention is applicable in a wide range of contexts. As a further example, manufacturers of high fidelity loudspeakers commonly offer their products in a wide range of wood veneers or other materials. The display in this case might include a 3D scene showing different speakers in a domestic setting, and a 2D display of samples of different veneers and materials which, when selected by the user, are mapped onto the speakers shown in the 3D scene.

As well as, or as an alternative to, using the left hand frame for the selection of surface finishes, it may be used to control the selection of objects for insertion in the 3D scene. For example, the user may first generate an empty 3D interior based on measurements of a room. Subsequently the user may access the on-line catalogue of a furniture retailer and may select objects, such as a chair, which are then downloaded and inserted in the 3D scene using the same mechanism as that adopted for downloading textures in the preceding examples.

The techniques described above may form part of an on-line trading operation, in which, after the selection of certain objects and finishes, the user places an order, for example via a form displayed in the left hand frame. Optionally, payment may be made on-line, for example using an encrypted credit card number, and the order may be processed automatically at the retailer, for example by transferring data identifying the object and finish, and the purchaser's address, to a warehouse, or to a manufacturing/assembly operation in the case where the desired item is not already in stock.

In a preferred implementation of the system described above, the HTML pages initially returned by the web server include product references for the 2D samples and for 3D objects. These product references are passed to the plug-in application. This application interfaces via a web socket to a CGI (computer gateway information) script running on the web server. In this way, the client/server interface of the plug-in application uses WWW (world wide web) protocols to interface via a socket to a CGI script, rather than using a dedicated listener. The CGI script returns the data for the 2D fabric samples to be displayed on the left hand side of the screen, and 3D data for the objects displayed in the 3D interior. The user may indicate a choice of, e.g., fabric for an object by dragging and dropping the 2D fabric sample onto the relevant object in the 3D interior. The plug-in application responds by returning to the server both the identity of the selected fabric and the identity of the object in the 3D interior. The server may check that the combination of object and fabric is valid before returning the texture data to the plug-in application. If the combination is not valid, then a message to this effect is returned for display on the terminal. Alternatively, the plug-in application may submit a request for the return of texture data as soon as the user begins to drag the fabric sample towards the 3D interior. This further reduces the time taken to respond to the user's selection. When the texture data is returned, the plug-in application maps the texture data onto the object displayed in the 3D interior. In this example, the module of the application which carries out this mapping, constitutes in combination with the viewer application, the "display generator" of the first aspect of the invention A further feature of this implementation is that the display is arranged to switch between showing the 3D interior just within a frame on one side of the window, and showing the 3D interior full-frame. A switch is dispalyed in a footer at the bottom of the window. The application detects clicking on this switch by the user, and toggles between the two types of view accordingly.

What is claimed is:

1. A user interface for a display terminal, the user interface comprising:
   a) a 3-dimensional display region including at least one displayed object;
   b) a surface finish selector including a display of samples of surface finishes arranged to display to the user a plurality of alternative surface finishes for mapping onto at least one of said displayed objects, wherein each of the surface finish samples is associated with a network address of data defining a surface finish;
   c) a user input device for selecting one of the plurality of alternative surface finish samples;
   d) means responsive to the user input device for reading data corresponding to a surface finish selected by the user, and
   e) a display generator for mapping the selected surface finish onto the displayed object using said data.

2. A user interface as in claim 1, further comprising a movement controller for moving a viewpoint in the 3-dimensional display in response to a user input.

3. A display terminal incorporating a user interface as in claim 1.

4. A user interface for a display terminal, the user interface comprising:
   a) a 3-dimensional display region including one or more displayed objects;
   b) a surface finish selector arranged to display to the user a plurality of alternative surface finishes for the one or more displayed objects, wherein each surface finish is associated with a network address of data defining a surface finish;
   c) a user input device for selecting one of the plurality of alternative surface finishes;

d) means responsive to the user input device for reading, from a source which is remote from the terminal, data for a surface finish selected by the user, and e) a display generator for mapping the selected surface finish onto the displayed object using the data;

wherein both the surface finish selector and the 3-dimensional display region form part of web pages displayed by a web client.

5. A user interface for a display terminal, the user interface comprising:

a) a 3-dimensional display region including one or more displayed objects;

b) a surface finish selector arranged to display to the user a plurality of alternative surface finishes for said one or more displayed objects, wherein each surface finish is associated with a network address of data defining a surface finish;

c) a user input device for selecting one of the plurality of alternative surface finishes;

d) means responsive to the user input device for reading, from a source which is remote from the terminal, data for a surface finish selected by the user, and e) a display generator for mapping the selected surface finish onto the displayed object using the data;

wherein the surface finish selector includes a 2D display of samples of said surface finishes; and wherein the surface finish selector further comprises icons representing displayed objects to which the finishes shown in the samples may be applied.

6. A user interface for a display terminal, the user interface comprising:

a) a 3-dimensional display region including one or more displayed objects;

b) a surface finish selector arranged to display to the user a plurality of alternative surface finishes for said one or more displayed objects, wherein each of the surface finishes is associated with a network address of data defining a surface finish;

c) a user input device for selecting one of the plurality of alternative surface finishes;

d) means responsive to the user input device for reading, from a source which is remote from the terminal, data for a surface finish selected by the user, and e) a display generator for mapping the selected surface finish onto the displayed object using the data;

wherein the surface finish selector is a first web page arranged to pass control data to a second web page including the 3-dimensional display region, and the second web page is arranged to import texture data from a network address determined by the said control data, and is arranged to map the said texture data onto a respective object in the 3-dimensional display region.

7. A user interface for a display terminal, the user interface comprising:

a) a 3-dimensional display region including one or more displayed objects;

b) a surface finish selector arranged to display to the user a plurality of alternative surface finishes for said one or more displayed objects, wherein each of the surface finishes is associated with a network address of data defining a surface finish;

c) a user input device for selecting one of the plurality of alternative surface finishes;

d) means responsive to the user input device for reading, from a source which is remote from the terminal, data for a surface finish selected by the user, and e) a display generator for mapping the selected surface finish onto the displayed object using the data; and a pricing calculator which is arranged automatically to calculate and display the total price of an object displayed in the 3-dimensional environment depending on the selected finish.

8. A method of operating a display terminal comprising:

a) displaying a 3-dimensional environment including one or more objects, b) displaying to a user samples of surface finishes for application to said objects, wherein each surface finish sample is associated with a network address of data defining a surface finish;

c) selecting by a user input device a surface finish sample;

d) forming a connection via a communications network to a source of surface finish data, said source associated with a network address and retrieving data corresponding to the selected finish from the network address; and e) mapping said surface finish data onto at least one object in the 3-dimensional environment.

9. A method as in claim 8 in which the source of data for display comprises a trader's on-line catalogue, and the method includes importing a selected sample and/or importing said 3-dimensional environment, or importing parts of said 3-dimensional environment, from said on-line catalogue.

10. A method of operating a display terminal comprising:

a) loading and displaying one the terminal a web page including a plurality of surface finishes, wherein each of the surface finish samples is associated with a network address of data defining a surface finish;

b) loading and displaying on the terminal a web page including a 3-dimensional environment, which 3-dimensional environment includes one or more objects; and c) in response to selection by the user of one of the plurality of a surface finishes displayed in step (a), importing surface finish data from the associated network address and mapping the surface finish data onto one of the objects displayed in step (b).

11. A method as in claim 11 including preliminary steps of:

i) entering at the display terminal user data defining a 3-dimensional environment;

ii) importing from a source remote from the display terminal data defining the objects;

iii) generating said 3-dimensional environment for display from the user data and said data defining said objects.

12. A method as in claim 10, in which the source of data for display comprises a trader's on-line catalogue, and the method includes importing a selected sample and/or importing the 3-dimensional environment, or importing parts of said 3-dimensional environment, from said on-line catalogue.

13. A method as in claim 10, in which the user selects a surface finish for an object by dragging a displayed sample surface onto one of said objects in the 3-dimensional environment.

14. A method as in claim 13, including generating a request for downloading of surface finish data as soon as the user begins to drag a displayed sample finish.

15. A method of operating a display terminal, said method comprising:

i) entering at the display terminal user data defining a 3-dimensional environment;

ii) importing from a source remote from the display terminal, data defining said objects;
iii) generating the said 3-dimensional environment for display from said user data and said data defining said objects; followed by:
   a) displaying a 3-dimensional environment including at least one object;
   b) displaying to a user samples of surface finishes which may be applied to the objects, wherein each of the surface finish samples is associated with a network address of data defining a surface finish;
   c) selecting by a user input one of the surface finishes;
   d) retrieving from a source which is remote from the terminal, surface data corresponding to the selected finish; and
   e) mapping said surface data onto the objects in the 3-dimensional environment.

16. A method of operating a display terminal, said method comprising:
   a) displaying a 3-dimensional environment including at least one object;
   b) displaying to a user samples of surface finishes which may be applied to the objects, wherein each of the surface finish samples is associated with a network address of data defining a surface finish;
   c) selecting by a user input one of the surface finishes;
   d) retrieving from a source which is remote from the terminal, surface data corresponding to the selected finish;
   e) mapping said surface data onto the objects in the 3-dimensional environment,
   wherein the user selects a surface finish for an object by dragging a displayed sample surface finish onto one of said objects in the 3-dimensional environment.

17. A method as in claim 16, including generating a request for downloading of surface finish data as soon as the user begins to drag a displayed sample finish.

18. A user interface for a display terminal, said user interface comprising:
   means for loading and displaying on the terminal a web page including a plurality of surface finish samples, wherein each of the surface finish samples is associated with a network address of data defining a surface finish;
   means for loading and displaying on the terminal a web page including a 3-dimensional environment, which 3-dimensional environment includes at least one object; and
   means operable to import surface finish data and map said data onto one of said objects in response to selection by the user of one of the plurality of surface finish samples.

19. A user interface for a display terminal as in claim 18 further including:
   means enabling entry at the display terminal, user data defining a 3-dimensional environment;
   means for importing from a source remote from the display terminal data defining said objects; and
   means to generate said 3-dimensional environment for display from said user data and said data defining said objects.

20. A user interface for a display terminal as in claim 18 including:
   means for forming a connection via a communications network to a source of data for display.

21. A user interface for a display terminal as in claim 18, in which:
   the source of data for display comprises a trader's on-line catalogue, and the user interface is capable of importing a selected sample and/or importing said 3-dimensional environment, or importing parts of said 3-dimensional environment, from said on-line catalogue.

22. A user interface for a display terminal as in claim 18, in which:
   means are provided to enable the user to select a surface finish for an object by dragging a displayed sample surface finish onto one of said objects in the 3-dimensional environment.

23. A user interface for a display terminal as in claim 18, including:
   means for generating a request for downloading of surface finish data as soon as the user begins to drag a displayed sample finish.

24. A user interface for a display terminal, the user interface comprising:
   a) a 3-dimensional display region including at least one displayed object;
   b) a surface finish selector including a display of one or more samples of surface finishes arranged to display to the user one or more alternative surface finishes for mapping onto at least one of said displayed objects, wherein each of the surface finish samples is associated with a network address of data defining a surface finish;
   c) a user input device for selecting a surface finish sample;
   d) means responsive to the user input device for reading data corresponding to a surface finish selected by the user, and
   e) a display generator for mapping the selected surface finish onto the displayed object using said data.

25. A user interface for a display terminal, the user interface comprising:
   a) a 3-dimensional display region including one or more displayed objects;
   b) a surface finish selector including a display of one or more samples of surface finishes arranged to display to the user one or more alternative surface finishes for mapping onto at least one of said displayed objects, wherein each of the surface finish samples is associated with a network address of data defining a surface finish;
   c) a user input device for selecting a surface finish sample;
   d) means responsive to the user input device for reading data for a surface finish selected by the user, and
   e) a display generator for mapping the selected surface finish onto the displayed object using the data;
   wherein both the surface finish selector and the 3-dimensional display region form part of web pages displayed by a web client.

26. A user interface for a display terminal, the user interface comprising:
   a) a 3-dimensional display region including one or more displayed objects;
   b) a surface finish selector including a display of one or more samples of surface finishes arranged to display to the user one or more alternative surface finishes for mapping onto at least one of said displayed objects, wherein each of the surface finish samples is associated with a network address of data defining a surface finish;
   c) a user input device for selecting a surface finish sample;
   d) means responsive to the user input device for reading data for a surface finish selected by the user, and
   e) a display generator for mapping the selected surface finish onto the displayed object using the data;

wherein the surface finish selector includes a 2D display of samples of said surface finishes; and wherein the surface finish selector further comprises icons representing displayed objects to which the finishes shown in the samples may be applied.

27. A user interface for a display terminal, the user interface comprising:
   a) a 3-dimensional display region including one or more displayed objects;
   b) a surface finish selector including a display of one or more samples of surface finishes arranged to display to the user one or more alternative surface finishes for mapping onto at least one of said displayed objects, wherein each of the surface finish samples is associated with a network address of data defining a surface finish;
   c) a user input device for selecting a surface finish sample;
   d) means responsive to the user input device for reading data for a surface finish selected by the user, and
   e) a display generator for mapping the selected surface finish onto the displayed object using the data;
   wherein the surface finish selector is a first web page arranged to pass control data to a second web page including the 3-dimensional display region, and the second web page is arranged to import texture data from a network address determined by the said control data, and is arranged to map the said texture data onto a respective object in the 3-dimensional display region.

28. A user interface for a display terminal, the user interface comprising:
   a) a 3-dimensional display region including one or more displayed objects;
   b) a surface finish selector including one or more samples of surface finishes arranged to display to the user one or more samples of alternative surface finishes for mapping onto at least one of said displayed objects, wherein each of the surface finish samples is associated with a network address of data defining a surface finish;
   c) a user input device for selecting a surface finish sample;
   d) means responsive to the user input device for reading data for a surface finish selected by the user, and
   e) a display generator for mapping the selected surface finish onto the displayed object using the data; and
   a pricing calculator which is arranged automatically to calculate and display the total price of an object displayed in the 3-dimensional environment depending on the selected finish.

29. A method of operating a display terminal comprising:
   a) displaying a 3-dimensional environment including one or more objects,
   b) displaying to a user one or more samples of surface finishes for mapping onto at least one of said objects, wherein each surface finish sample is associated with a network address of data defining a surface finish;
   c) selecting by a user input device a surface finish sample;
   d) forming a connection via a communications network to a source of surface finish data, said source associated with a network address and retrieving data corresponding to the selected finish from the network address; and
   e) mapping said surface finish data onto at least one object in the 3-dimensional environment.

30. A method of operating a display terminal comprising:
   a) loading and displaying one the terminal a web page including one or more surface finishes, wherein each of the surface finish samples is associated with a network address of data defining a surface finish;
   b) loading and displaying on the terminal a web page including a 3-dimensional environment, which 3-dimensional environment includes one or more objects; and
   c) in response to selection by the user of a surface finish displayed in step (a), importing surface finish data from the associated network address and mapping the surface finish data onto one of the objects displayed in step (b).

31. A method of operating a display terminal, said method comprising:
   i) entering at the display terminal user data defining a 3-dimensional environment;
   ii) importing from a source remote from the display terminal, data defining said objects;
   iii) generating the said 3-dimensional environment for display from said user data and said data defining said objects; followed by:
      a) displaying a 3-dimensional environment including at least one object;
      b) displaying to a user one or more samples of surface finishes which may be applied to the objects, wherein each of the surface finish samples is associated with a network address of data defining a surface finish;
      c) selecting by a user input a surface finish sample;
      d) retrieving surface data corresponding to the selected finish; and
      e) mapping said surface data onto the objects in the 3-dimensional environment.

32. A user interface for a display terminal, the user interface comprising:
   a) a 3-dimensional display region including at least one displayed object;
   b) a surface finish selector including a display arranged for displaying to a user at least one surface finish sample received from a remote source for mapping onto said at least one displayed object, the user receiving one surface finish sample at a time from the remote source, wherein each surface finish sample is associated with a network address, the network address having associated means for storing data defining a surface finish;
   c) a user input device for selecting a surface finish sample from among one or more surface finish samples;
   d) means responsive to the user input device for reading data corresponding to a surface finish selected by the user, and
   e) a display generator for mapping selected surface finish data onto the displayed object using said data.

33. A method of operating a display terminal, said method comprising:
   a) displaying a 3-dimensional display region including at least one displayed object;
   b) displaying to a user at least one surface finish sample received from a remote source for mapping onto said at least one displayed object, the user receiving one surface finish sample at a time from the remote source, wherein each surface finish sample is associated with a network address, the network address having associated means for storing data defining a surface finish;
   c) selecting a surface finish sample from among one or more surface finish samples;
   d) retrieving data corresponding to a surface finish selected by the user, and
   e) mapping selected surface finish data onto the displayed object using said data.

* * * * *